United States Patent [19]

Witte et al.

[11] 3,872,096

[45] Mar. 18, 1975

[54] 2-AMINOALKYL-SUBSTITUTED CYCLIC IMIDO ESTERS AND PROCESS FOR THE PREPARATION THEREOF

[75] Inventors: Helmut Witte; Wolfgang Seeliger, both of Marl, Germany

[73] Assignee: Chemische Werke Huels Aktiengesellschaft, Marl, Germany

[22] Filed: Apr. 25, 1973

[21] Appl. No.: 354,462

[30] Foreign Application Priority Data
Apr. 26, 1972 Germany............................ 2220413

[52] U.S. Cl. .......... 260/307 F, 252/392, 260/244 R
[51] Int. Cl. ............................................. C07d 85/36
[58] Field of Search .................... 260/307 F, 244 R

[56] References Cited
UNITED STATES PATENTS
2,579,478  12/1951  Djerassi et al. ..................... 260/243

Primary Examiner—Donald G. Daus
Assistant Examiner—Raymond V. Rush
Attorney, Agent, or Firm—Millen, Raptes & White

[57] ABSTRACT

2-Aminoalkyl substituted cyclic imido esters, useful as intermediates and corrosion inhibitors, of the formula

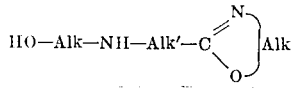

wherein Alk is ethylene, propylene or trimethylene and Alk' is ethylene or propylene, are prepared by reacting a nitrile of one of the formulae

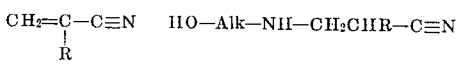

wherein R is H or $CH_3$, with an appropriate alkanolamine.

5 Claims, No Drawings

3,872,096

2-AMINOALKYL-SUBSTITUTED CYCLIC IMIDO ESTERS AND PROCESS FOR THE PREPARATION THEREOF

BACKGROUND OF THE INVENTION

This invention relates to 2-aminoalkyl-substituted cyclic imido esters and to a process for the preparation thereof.

It is known from U.S. Pat. No. 3,488,294 that is is possible to convert nitrile groups in polyacrylonitrile partially into $\Delta^2$-oxazoline and 4H-5,6-dihydrooxazine-1,3 groups by the effect of amino alcohols in the presence of sodium methylate as the catalyst. However, this process is unsuitable for producing cyclic imido esters from low-molecular nitriles and amino alcohols in high yields and with satisfactory conversion.

It has been suggested to produce cyclic imido esters from nitriles and amino alcohols in a simple manner, with good yields, and a high conversion, by conducting the reaction in the presence of a metallic salt sufficiently soluble in the reaction medium, the cation of this salt being lithium, copper, calcium, zinc, cadmium, manganese, nickel and cobalt. See German Patent Applications Nos. P 21 27 776.9 and P 21 58 061.0 (U.S. application Ser. No. 259,310, filing date 2-6-1972).

SUMMARY OF THE INVENTION

According to this invention, novel 2-aminoalkyl-substituted cyclic imido esters of the general Formulae I and II

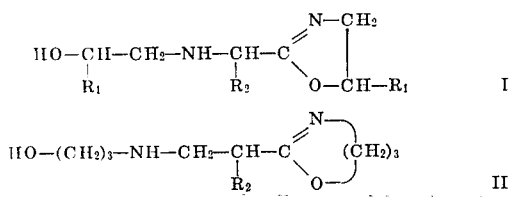

wherein $R_1$ and $R_2$, which can be alike or different, each is a hydrogen atom or methyl, can be produced by a. reacting a nitrile of the general Formula III

with ethanolamine, 1-amino-2-propanol of 1-amino-3-propanol;

b. reacting a nitrile of the general Formula IV

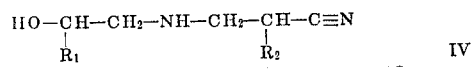

with ethanolamine or 1-amino-2-propanol; or c. reacting a nitrile of the general Formula V

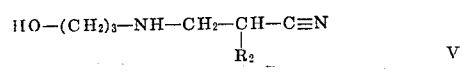

with 1-amino-3-propanol, $R_1$ and $R_2$ in each instance having the values given above, in the presence, as a catalyst, of a salt of lithium, copper, calcium, zinc, cadmium, manganese, nickel or cobalt which is at least partially soluble in the reaction medium, at a temperature of from 70° to 140° C., preferably while removing the thus-formed ammonia from the reaction mixture.

DETAILED DISCUSSION

The nitriles of general Formulae III, IV and V which are reacted with the above-mentioned amino alcohols in the process of this invention are 1-N-(2-cyanoethyl)-amino-3-propanol, 1-N-(2-cyanopropyl)-amino-3-propanol and especially acrylonitrile, methacrylonitrile, N-(2-cyanoethyl)-ethanolamine, N-(2-cyanopropyl)-ethanolamine, 1-N-(2-cyanoethyl)-amino-2-propanol, and 1-N-(2-cyanopropyl)-amino-2-propanol.

Suitable catalysts are salts of lithium, copper, calcium, zinc, cadmium, manganese, nickel and cobalt. All that is required is that the anion be one which imparts sufficient solubility to the salt so that the salts are soluble to a measurable extent in the reaction medium. Especially suitable is cadmium acetate. Examples of other salts of the above metals are chlorides or soluble organic acylates, e.g., acetates, propionates.

The catalytically active metallic salts are effective even in trace amounts but the use of about 0.01 – 0.1 mole of metallic salt per mole of nitrile is preferred. The metallic salts generally retain their catalytic activity beyond the end of the reaction, so that they can be employed repeatedly if the process is conducted batchwise, for example, in the form of the distillation residue from a prior batch.

When conducting the process of this invention using the unsaturated nitriles of general Formula III, prferably at least 2 moles, especially 2.0 – 2.2 moles, of the amino alcohol are used per mole of the nitrile.

The process of this invention can be conducted by adding the unsaturated nitrile at room temperature to a mixture of amino alcohol and catalyst, and then heating the reaction mixture, e.g., to 70°–140° C., preferably 90°–120° C. If an exothermic reaction occurs when the unsaturated nitrile is added to the mixture of the other reactants, the addition is conducted gradually and with cooling, so that the temperature of the reaction mixture does not exceed 25° C. The mixture can then be heated as described above after the addition is complete.

It is especially advantageous to prepare starting cyanoalkylated amino alcohols from acrylonitrile or methacrylonitrile and amino alcohols in a conventional manner (J. A. Bell, C. Kenworthy, Synthesis 1971, vol. 12, p. 652) and then to react these compounds without isolation in accordance with the invention with the same amino alcohol, after adding the metal-containing catalyst, to obtain the cyclic imido esters of the present invention.

In the production of the cyanoalkylated amino alcohols, it is sufficient to employ equimolar amounts of the reactants. However, in order to avoid side reactions, it is advantageous to also add initially the quantity of amino alcohol required for preparing the cyclic imido ester end product from the intermediate cyanoalkylated amino alcohol.

Thus, preferably at least 2.0 moles, especially 2.0–2.2 moles, per mole of nitrile, of the amino alcohol are employed in the reaction with the unsaturated nitrile, and the thus-formed cyanoalkylated amino alcohol is then reacted with the residual aminoalcohol in accordance with the process of this invention, after adding the catalyst at 70°–140° C., preferably 90°–120° C., while driving off the ammonia produced in the reaction, to produce the corresponding 2-amino-alkylated cyclic imido ester.

The process of this invention can be conducted in the presence of an inert gas under ambient pressure, or under elevated or reduced pressure. The use of nitrogen at ambient pressure is preferred.

The process of the present invention can also be conducted in the presence of an inert solvent, e.g., tetrahydrofuran or dioxane.

The reaction batches are generally worked up by means of distillation under reduced pressure to remove the desired product and other volatiles. Obtaining the desired cyclic imido esters by distillation is surprising, because the cyanoalkylated amino alcohols of a corresponding structure, from which the cyclic imido esters of this invention can be prepared, are subject to a complete $\beta$-splitting into amino alcohol and unsaturated nitrile during an attempt at distillation. (See J. A. Bell, C. Kenworthy, Synthesis 1971, vol. 12, p. 652, fourth paragraph.) One would expect that the cyclic imido esters of this invention would similarly be dissociated into an unsaturated oxazoline and an amino alcohol during distillation or at the temperature employed according to the process of this invention.

The compounds of this invention can be obtained in a small number of simple process steps from technically readily accessible starting materials. They can be employed as intermediates for the preparation of 2-alkenyl-$\Delta^2$-oxazolines in a better manner as known in the art. For example the 2-[1-methyl-2-(2-hydroxyethylamino)-ethyl]-$\Delta^2$-oxazoline produced by the method of example 3, at higher temperatures undergoes cleavage to give 2-isopropenyl-$\Delta^2$-oxazoline which is a useful monomer.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Under cooling 53 g. of acrylonitrile is added dropwise to 122 g. of ethanolamine in such a manner that the temperature in the reaction medium does not rise about 20° C. After the addition step is completed, the reaction mixture is allowed to stand at room temperature for 24 hours then, 5.5 g. of pulverized cadmium acetate [Cd(CH$_3$COO)$_2$ . 2 H$_2$O] is added thereto and the reaction mixture is heated under nitrogen to 100° C., for 14 hours. The subsequent distillation under an oil vacuum yields a 58.2 g. fraction, distilling at 110-120° C./0.1 torr [mm. Hg] of { 2-[2-(2-hydroxyethylamino)-ethyl] } - $\Delta^2$-oxazoline which solidifies into crystals. The yield is 37% of theory.

A sample of the crystals, further purified by squeezing the liquid from them, had the following elementary analysis:

| | | | | |
|---|---|---|---|---|
| Calculated: | C 53.14 | H 8.92 | O 20.23 | N 17.71 |
| Found: | C 52.87 | H 8.98 | O 20.32 | N 17.22 |

The IR spectrum of the compound shows the characteristic band of the C=N double bond at 1,660 cm$^{-1}$.

EXAMPLE 2

53 g. of acrylonitrile is added dropwise to 150 g. of 1-amino-2-propanol under cooling to 20°-25° C. The reaction mixture is allowed to stand for one day at room temperature. Then 5.5 g. of pulverized cadmium acetate [Cd(CH$_3$COO)$_2$ . 2 H$_2$O] is added thereto, and the mixture is heated to 90°-100° C. under a nitrogen atmosphere for 25 hours. Subsequent distillation yields a 109.4 g. fraction distilling at 115°-123° C./0.25 torr consisting of 2-[2-(2-hydroxypropylamino)-ethyl]-5-methyl-$\Delta^2$-oxazoline ($n_D^{20}$ 1.4770). The yield is 58% of theory.

The IR spectrum of the compound has the characteristic band of the C=N double bond at 1,665 cm$^{-1}$.

EXAMPLE 3

A mixture of 67 g. of methacrylonitrile and 122 g. of ethanolamine is heated for 3 hours to 70° C. After cooling, 5.5 g. of cadmium acetate [Cd(CH$_3$COO)$_2$ . 2 H$_2$O] is added thereto, and the mixture is heated to 90°-100° C., under a nitrogen atmosphere for 25 hours. Distillation of the reaction product yields an 84.6 g. fraction distilling at 115°-118° C./0.2 torr of 2-[1-methyl-2-(2-hydroxyethylamino)-ethyl]-$\Delta^2$-oxazoline ($n_D^{20}$ 1.4863). The yield is 49% of theory.

| | | | | |
|---|---|---|---|---|
| Calculated: | C 55.79 | H 9.36 | O 18.58 | N 16.27 |
| Found: | C 55.02 | H 9.41 | O 18.49 | N 16.87 |

In the IR spectrum of the compound, the band characteristic for the C=N double bond is at 1,660 cm$^{-1}$.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 2-aminoalkyl-substituted cyclic imido ester of one of the formulae

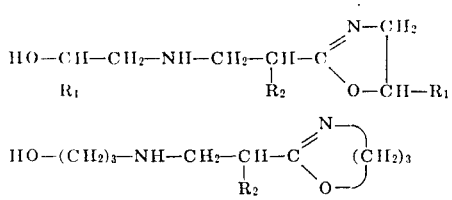

wherein R$_1$ and R$_2$ each are a hydrogen atom or methyl.

2. The compound of claim 1 of the formula

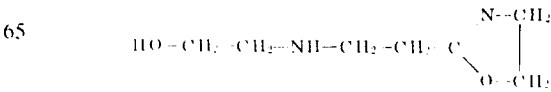

3. The compound of claim 1 of the formula
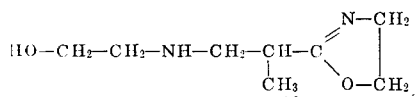
4. The compound of claim 1 of the formula
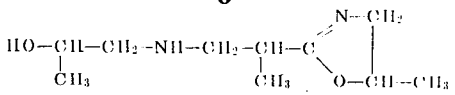
5. The compound of claim 1 of the formula
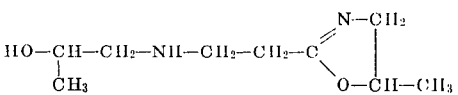
* * * * *